United States Patent Office.

GEORGE W. SCOLLAY, OF ST. LOUIS, MISSOURI.

*Letters Patent No.* 61,472, *dated January* 22, 1867; *antedated January* 19, 1867; *reissue No.* 2,691, *dated July* 16, 1867.

IMPROVEMENT IN EMBALMING DEAD BODIES AND CARCASSES.

The Schedule referred to in these Letters Patent and making part of the same.

TO ALL WHOM IT MAY CONCERN:

Be it known that I, GEORGE W. SCOLLAY, of the city and county of St. Louis, in the State of Missouri, at present sojourning in Washington, in the District of Columbia, have invented a new and useful Improvemen in the Art of Enbalming or Preserving Dead Bodies or Carcasses; and I do hereby declare the following to be a full, clear, and exact description of the same.

My invention consists in subjecting the body or carcass to the influence of an antiseptic gas or gases in such manner as to thoroughly incorporate the gas with or diffuse it through the body so as to preserve the same.

In practising my invention, I first generate or make in any suitable receiver or retort some one or more of the antiseptic gases, of which there are several, such as chlorine, sulphurous, muriatic, or carbonic acid gas. I then take the body, either before or after it has been placed in the coffin, and make an incision in the arterial or vascular system, preferring the tibial or radial arteries, in which incision I introduce the beak of a flexible tube connected to a receiver or reservoir in which the gas is generated or contained, said tube being fitted with a cock or valve to regulate the flow of the gas. The connection having been thus made between the body and the gas-receiver, generater, or holder, I open the stop-cock or valve, when the gas, by the pressure obtained in generating it in the receiver, forces itself through the entire vascular system, and thoroughly incorporates itself with the tissue or substance of the body so as to preserve it from putrefaction. This I think the best internal application of the gas or gases, but they may be applied through the rectum into the bowels, or through the nose or mouth into the stomach or lungs, but this method of applying the gases will not be found so effectual in suspending or hindering the decomposition of the entire body. In warm weather an injection of the gases into the bowels will be found a valuable auxiliary in embalming, but to effectually preserve the body in all its parts from putrefaction, the introduction of the gases into the vascular system will be found most efficient. In practising my invention a generator, receiver, or chamber may be made in the coffin, or in connection with it, or separate from it, and fitted with a tube, which should be flexible, as described above, to make the connection between the body and the chamber before generating the gas, and the tube may be left without a stop-cock or valve, so as to allow the gas to flow into the system as fast as generated. This plan may be pursued in embalming the body before it is put in the coffin, but my purpose is to make a chamber in the coffin, or in close connection with it, to generate the gases in, so that the body can be put into the coffin, embalmed, closed up, and left without further molestation. In practising this invention, it may be found that the amount of gas which the body will hold at one time, in either the bowels, stomach, or lungs, or in the arterial or vascular system, will not be found sufficient to preserve it in warm weather; that is to say, the antiseptic element contained in that amount of gas may not be sufficient to thoroughly embalm the body, in which case it will be necessary to continue the flow of the gas through or into the vascular or arterial system, until enough of the antiseptic element has been incorporated with the tissue to preserve it. This continual flow of gas through the vascular system I maintain by making an incision through the lower extremity of each of the tibial arteries, and by inserting the beak of the tube in one of said incisions to introduce the gas to the arterial system, leaving the other incision open for the gas to escape from after it has passed through the body. In this application of the invention, an air and gas-tight coffin is necessary to hold the gas in contact with the body after it has passed through it. This is especially necessary when it is desired to subject the body to the influence of the gases externally as well as internally. But when the body is to be embalmed before it is put into the coffin, or in an open coffin, by the internal application of the gas merely, a receiver must be used to catch the gas as it issues from the body. In some cases after the body has been embalmed by the introduction of the gas into the vascular system, as above stated, it may be well to surround it with an atmosphere of the embalming gas by placing it in a tight coffin, and introducing the gases, as above stated, as an auxiliary to preserve the body a very long time. The essential and distinctive feature of this invention, however, is the preservation of the body or carcass from putrefaction by the internal application of antiseptic gases instead of antiseptic fluids, and the application may be extended to all sorts of animal carcasses, to which the gas or gases may or can be applied, substantially as above stated, not intending to confine my claim to the preservation of any particular kind of animal bodies or to the use of any particular kind of antiseptic gas or gases.

What I claim, therefore, and desire to secure by Letters Patent, is—

1. Embalming dead bodies and carcasses, and preserving them from putrefaction, by introducing antiseptic gas or gases into the arterial or vascular system, substantially as described.

2. Embalming dead bodies and carcasses or preserving them from putrefaction, by the introduction of antiseptic gas or gases into the bowels, stomach, or lungs, substantially as set forth.

3. Embalming dead bodies or carcasses, or preserving them from putrefaction by combining the internal and external application of the gases thereto, substantially in the manner described.

GEORGE W. SCOLLAY.

Witnesses:

AMOS BROADNAX,

TIMOTHY CRONIN.